United States Patent [19]

McLean, II et al.

[11] Patent Number: 5,411,722

[45] Date of Patent: May 2, 1995

[54] COMPACT REACTION CELL FOR HOMOGENIZING AND DOWN-BLANDING HIGHLY ENRICHED URANIUM METAL

[75] Inventors: William McLean, II, Oakland; Philip E. Miller; James A. Horton, both of Livermore, all of Calif.

[73] Assignee: The United States of America as represented by the United States Department of Energy, Washington, D.C.

[21] Appl. No.: 141,753

[22] Filed: Oct. 27, 1993

[51] Int. Cl.$^6$ .............................................. C01G 43/00
[52] U.S. Cl. .................... 423/253; 423/301; 423/261
[58] Field of Search .................. 423/301, 253, 261

[56] References Cited

U.S. PATENT DOCUMENTS

| | | | |
|---|---|---|---|
| 3,698,697 | 10/1972 | Gillies et al. | 263/32 R |
| 4,090,976 | 5/1978 | DeHollander et al. | 252/301.1 R |
| 4,439,402 | 3/1984 | Tarutani et al. | 422/159 |
| 4,764,228 | 8/1988 | Silver | 148/6.14 R |
| 4,830,841 | 5/1989 | Urea | 423/261 |
| 5,009,817 | 4/1991 | Hodgson | 264/0.5 |
| 5,045,289 | 9/1991 | Fernando et al. | 423/21.1 |

*Primary Examiner*—Daniel D. Wasil
*Assistant Examiner*—Meena Chelliah
*Attorney, Agent, or Firm*—Miguel A. Valdes; Roger S. Gaither; William R. Moser

[57] ABSTRACT

The invention is a specialized reaction cell for converting uranium metal to uranium oxide. In a preferred form, the reaction cell comprises a reaction chamber with increasing diameter along its length (e.g. a cylindrical chamber having a diameter of about 2 inches in a lower portion and having a diameter of from about 4 to about 12 inches in an upper portion). Such dimensions are important to achieve the necessary conversion while at the same time affording criticality control and transportability of the cell and product. The reaction chamber further comprises an upper port and a lower port, the lower port allowing for the entry of reactant gasses into the reaction chamber, the upper port allowing for the exit of gasses from the reaction chamber. A diffuser plate is attached to the lower port of the reaction chamber and serves to shape the flow of gas into the reaction chamber. The reaction cell further comprises means for introducing gasses into the reaction chamber and a heating means capable of heating the contents of the reaction chamber.

The present invention also relates to a method for converting uranium metal to uranium oxide in the reaction cell of the present invention.

The invention is useful for down-blending highly enriched uranium metal by the simultaneous conversion of highly enriched uranium metal and natural or depleted uranium metal to uranium oxide within the reaction cell.

15 Claims, 2 Drawing Sheets

COMPACT REACTION CELL FOR HOMOGENIZING AND DOWN-BLANDING HIGHLY ENRICHED URANIUM METAL

GOVERNMENT RIGHTS

The United States Government has rights in this invention pursuant to Contract No. W-7405-ENG-48 between the United States Department of Energy and the University of California.

FIELD OF THE INVENTION

The present invention relates to a cell useful for converting uranium metal to uranium oxide. The present invention also relates to a method for homogenizing and down-blending highly enriched uranium metal by combining the highly enriched uranium metal with natural or depleted uranium metal followed by the conversion of the uranium metal to uranium oxide using a novel chemical reaction cell.

BACKGROUND OF THE INVENTION

Large amounts of highly enriched uranium metal will be entering the global marketplace as a result of the dissolution of the Soviet Union and its large nuclear arsenal. For the new republics of the former Soviet Union, the highly enriched uranium metal derived from the former Soviet Union's nuclear arsenal represents a much needed source of income. However, the prospect of nuclear weapon grade uranium becoming accessible to countries who do not presently possess nuclear weapon capability is a subject of significant concern. In response to this concern, the United States has legislated the creation of the United States Enrichment Corporation (USEC). One of the objectives of the USEC is the purchase of the highly enriched uranium metal from the republics of the former Soviet Union. The uranium purchased is to be converted into a lower grade of enriched uranium that is not suitable for use in nuclear weapons.

Several significant problems face any party seeking to purchase and transport the highly enriched uranium from the former Soviet Union. Assaying such highly enriched uranium will be difficult, since the uranium is not expected to have homogeneous isotope or elemental content. Each batch of highly enriched uranium sold will likely come from a variety of weapons, each with a different production history. Further, the uranium will most likely be offered for sale as unrecognizable pieces of metal, each possessing a different elemental and isotopic composition. In addition, given the monetary value of highly enriched uranium, there is a strong likelihood that the parties offering the uranium for sale may attempt to dilute the highly enriched uranium with lesser grade uranium in order to enhance the profits derived from these transactions.

The politically sensitive nature of this material also increases the likelihood that parties, either at the personal (individual worker) or official (government) level, will attempt to divert some of the highly enriched uranium.

At present, an efficient method for determining the overall isotope and elemental composition of large quantities of inhomogeneous chunks of uranium metal is needed. Given the large volume and the radioactive property of this material, sampling each individual piece of metal is neither practical nor suitable. Given the piece by piece inhomogeneity of the uranium metal, a large number of random samples would need to be tested in order to obtain a statistically accurate measurement of the average isotope and elemental content of the uranium. However, even with random sampling, substitutions and/or diversions can nonetheless occur in a statistically significant manner.

Transportation of highly enriched uranium is a second significant problem, since the shipment of material which is 20 wt % or more $^{235}U$ is subject to restrictive NRC guidelines.

SUMMARY OF THE INVENTION

In order to overcome these dangers and limitations, the present invention relates to a specialized reaction cell for converting uranium metal to uranium oxide. In a preferred form, the reaction cell comprises a reaction chamber with increasing diameter along its length (e.g. a cylindrical chamber having a diameter of about 2 inches in a lower portion and having a diameter of from about 4 to about 12 inches in an upper portion). Such dimensions are important to achieve the necessary conversion while at the same time affording criticality control and transportability of the cell and product in a transportable reaction chamber. The reaction chamber further comprises an upper port and a lower port, the lower port allowing for the entry of gas into the reaction chamber, the upper port allowing for the exit of gas from the reaction chamber. A diffuser plate is attached to the lower port of the reaction chamber and serves to shape the flow of gas into the reaction chamber. The diffuser plate preferably comprises a disk possessing a multiplicity of holes smaller than 0.1 inch in diameter. The reaction cell further comprises a means for reducing the velocity of gas passing between said lower portion and said upper portion, and heating means capable of heating the contents of the reaction chamber.

The present invention also relates to a method for converting uranium metal to uranium oxide in the reaction cell of the present invention. According to this method, uranium metal is first added to the reaction chamber. The reaction chamber is then heated to at least 225° C. wherein hydrogen is added at a pressure of between 1-10 psi relative to the reaction chamber to convert the uranium metal to $UH_3$. After the $UH_3$ is formed, the hydride is converted to uranium oxide through the addition of oxygen. During the method, the voluminous reaction products are entrained in the flowing reactant gasses and carried out of the power portion and into the upper portion of the reaction cell. In the upper portion of the cell the solid products settle out of the carrier gas due to the change in diameter between the two portions.

The present invention also relates to a method for down-blending highly enriched uranium metal by the simultaneous conversion of highly enriched uranium metal and natural or depleted uranium metal to uranium oxide using the reaction cell of the invention.

BRIEF DESCRIPTION OF THE FIGURES

The invention will be better understood by reference to the appended drawings in which.

DETAILED DESCRIPTION OF THE INVENTION

The present invention relates to a method for homogenizing and down-blending highly enriched uranium metal while simultaneously converting the uranium metal to uranium oxide. The invention also relates to a reaction cell within which the uranium metal can be simultaneously homogenized, down-blended and converted into uranium oxide. Due to the compact size and simplicity of the cell, the uranium metal can be processed at the purchase site. By converting the inhomogeneous highly enriched uranium metal into a homogeneous grade of uranium oxide, the uranium purchased can be accurately assayed for its isotope and elemental content.

I. PRESCREENING OF HIGHLY ENRICHED URANIUM

Prior to accepting any uranium for processing, the uranium should be prescreened by both standard hand-held meters and gamma counters to ensure that no undesired radioactive materials, such as the isotopes of Pu, other transuranics, fission products or irradiated construction materials are present. If acceptable, the uranium metal should be weighed and loaded into the reaction cell. Once loaded into the reaction cell, a simple gas pycnometer cell (reference number 14, FIG. 1 along with helium gas 16) can be used to determine the volume of the metal. By measuring the volume and weight of the metal, it is possible to calculate the density of the material in order to ensure that the material is mostly composed of uranium. In this regard, a density of 19 g/cc is indicative of pure uranium while a lower density implies substantial contamination is present.

II. REACTION CELL SIZE

Figure 1:
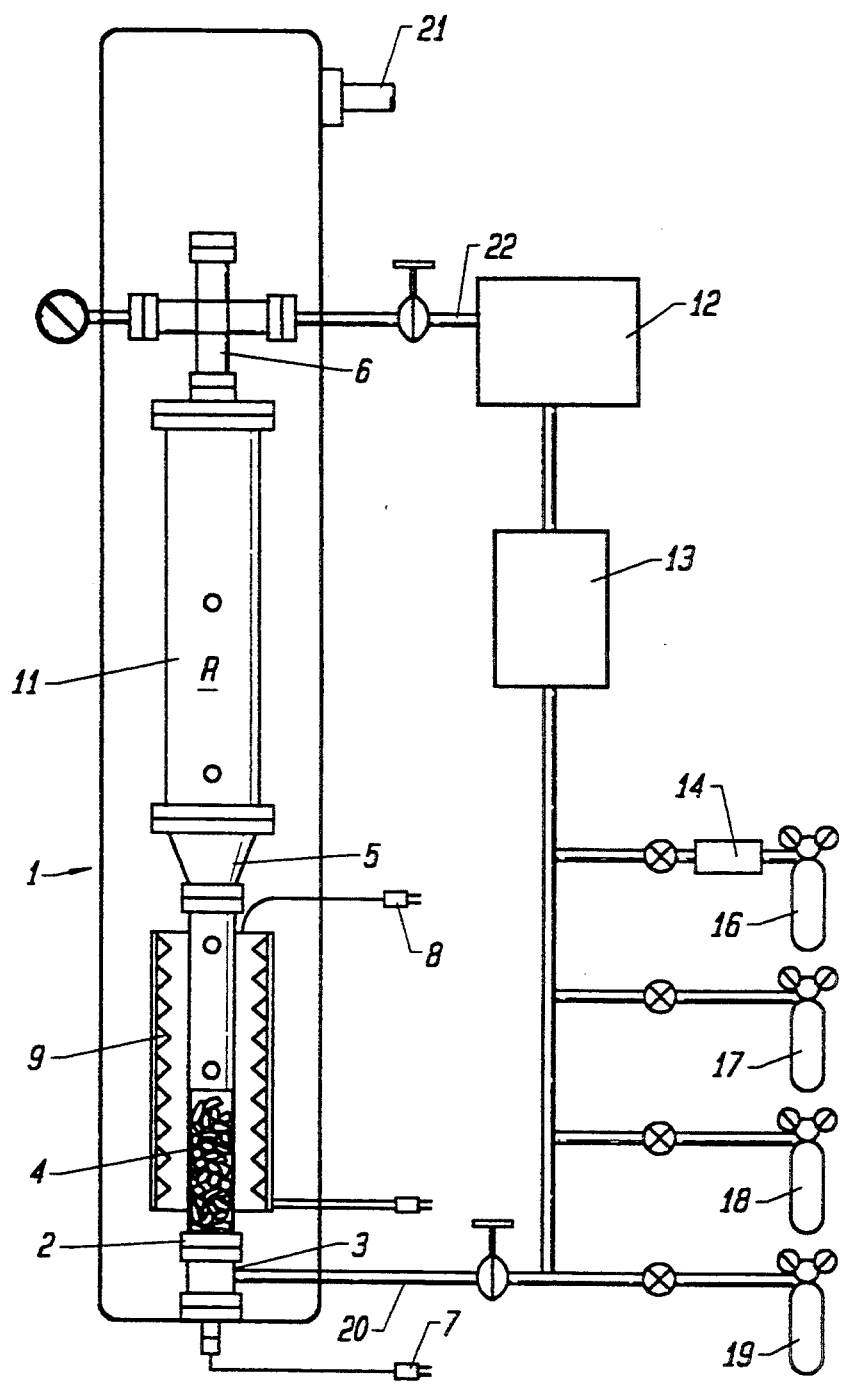
FIG. 1 depicts a reaction cell according to the invention.
Figure 1A:
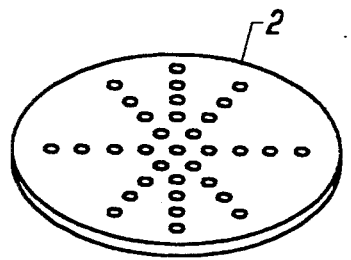
FIG. 1A shows a typical diffuser plate which can be incorporated in to the reaction cell.

A reaction cell according to the present invention is illustrated in FIGS. 1 and 1A. FIG. 1 shows a batch reaction cell (designated "R") used to convert the uranium metal to uranium oxide, which cell is housed within a containment vessel/plenum 1. The size of the reaction chamber of the cell is dictated by safety requirements and the need to be able to transport the cell to the site of the highly enriched uranium and then return it to the necessary domestic facility for handling. Safety requirements are a function of the number and spacing of the cells used together. To meet these requirements, the material within each cell must be less than the critical mass necessary to sustain a nuclear reaction. In addition, the placement of each cell must be such that reflected neutrons from nearby cells cannot participate in nuclear reactions.

Based on these requirements, it is preferred that the lower portion 4 of the cylindrically shaped reaction chamber (which will hold the reaction starting materials) have an inner diameter of from about two inches and a length of 3 feet, and an upper portion 11 have an inner diameter of from about 4 to about 12 inches, and preferably six inches. The length of the upper portion 11 can be determined by operational testing. In the present embodiment, a length of 4 feet for upper portion 11 is preferred in order for the chamber to be of sufficient length to permit settling of the reaction products and, at the same time, fit within a standard transportainer. Conically shaped coupling 5 provides a transition from lower portion 4 to upper portion 11. This change in diameter, and corresponding change in volume along the chamber will accommodate the increase in volume of the reaction products versus the starting materials. In its preferred configuration, the cell is sized to process loads of approximately 8 kg of highly enriched uranium.

An important aspect of the invention is that the reaction cells can be configured within a shipping container for the generated uranium oxide. This is most preferably accomplished using a "transportainer" configuration like that shown in FIGS. 2 and 3, as discussed in greater detail below.

III. CONVERSION OF THE URANIUM METAL TO URANIUM OXIDE

Homogenization of the highly enriched uranium can be simultaneously achieved during the conversion of the uranium metal to uranium hydride using the reaction cell of the present invention. The present invention exploits the high reactivity of hydrogen with metallic uranium. The reaction:

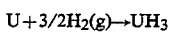

$$U + 3/2 H_2(g) \rightarrow UH_3$$

is extremely vigorous at 250° C. A heating means 9 capable of heating the contents of the reaction chamber to at least 225° C. is incorporated into the reaction cell in order to initiate this vigorous reaction. Hydrogen gas is supplied from tank 17. If the reaction is attempted at greater than 250° C., then the reverse reaction is dominant. At temperatures significantly less than 250° C. the reaction kinetics are slow. It is thus preferred to operate at about 250° C., and in no case less than 225° C.

In order to convert the uranium metal to uranium hydride, hydrogen gas is introduced upwardly into the lower portion 4 at low pressure (1–10 psi above the pressure in the reaction chamber). During the conversion of uranium metal to uranium hydride, the metal undergoes a volume expansion of approximately 75% upon forming $UH_3$. As a result of this sudden increase in volume, the metal lattice is severely strained wherein the hydrided solid separates itself into small particles of $UH_3$. Hence, through the conversion of uranium metal to uranium hydride, the large pieces of highly enriched uranium metal in the cell are rapidly and effectively converted into significantly smaller pieces of uranium hydride.

In order to facilitate the mixing of the generated $UH_3$ in the reactor chamber, the reactor cell includes a diffuser plate 2 (shown in enlarged detail in FIG. 1A) located at lower port 3 of reaction cell. The diffuser plate is designed to distribute the gas as it enters the reaction cell. During the hydride formation step, small particles of $UH_3$ separate from the uranium metal and become entrained in the upward gas flow until the velocity drops in the conical expansion region 5. The newly formed uranium hydride particles are thoroughly mixed by the flow of hydrogen gas into the reaction cell to yield a homogeneous composition of uranium hydride particles with regard to their isotope content. The conical expansion region of hydrogen gas thus provides both a means for continually exposing fresh metal surfaces for further reaction and a means for producing a homogeneous hydride product.

The reaction cell has the further feature that the unreacted gas exits the reaction chamber through an upper port 6 to outlet header pipe 22 where the unreacted gas is compressed using compressor 12 and is ultimately returned to the reaction chamber through the diffuser plate. A water trap 13 may also be used. In this regard, the operation of the cell is somewhat analogous to a standard fluidized bed reactor construction. However, in this case, the fluidized bed medium consists of the particulate reaction product.

If desired, down-blending of the highly enriched uranium can be simultaneously accomplished during the conversion of uranium metal to uranium hydride. By combining a known quantity of slightly enriched natural and/or depleted uranium with the highly enriched uranium, the highly enriched uranium can be down-blended in the reaction cell as it is converted to uranium hydride as a result of the thorough mixing that occurs during the hydride forming reaction.

An important advantage of the present invention is the fact that down-blending of the highly enriched uranium can be performed at the point of sale, and further, can be performed in the same reaction cell simultaneously with the conversion of the uranium metal to the uranium oxide. By down-blending the highly enriched uranium to a non-weapon grade of uranium on site, concern over the diversion of the highly enriched uranium for use in nuclear weapons is considerably reduced. On-site down-blending offers the criticality control necessary for avoiding a self-sustaining nuclear fission reaction. Further, the present invention has the advantage that the uranium used to down-blend the highly enriched uranium can be of domestic origin, thus relieving some of the tension generated in the domestic uranium mining industry.

Based on the known kinetics of the hydride reaction, a mixture of 5% $H_2$ in Ar (so-called "safegas" because $H_2$ is at a concentration below its flammability limit in air) supplied from tank 19 will convert uranium solids having a particle size of approximately 40–50 micrometers in from about 5 to about 9 hours. Shorter reaction times are anticipated if pure $H_2$ gas is employed, and this is borne out by the experiments discussed below.

Once the hydriding of the uranium metal is complete, the resulting $UH_3$ can be converted to $UO_3$ by the addition of oxygen into the reaction chamber. $UH_3$ reacts readily with $O_2$ according to the reaction:

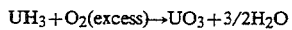

$$UH_3 + O_2(\text{excess}) \rightarrow UO_3 + 3/2 H_2O$$

The oxygen used is preferably in the form of air, which can be supplied from tank 18. The reaction is exothermic, therefore requiring that the temperature be controlled so as to avoid the overheating of the cell and its contents. This can be accomplished by using containment vessel 1 as a plenum for cool air circulation as well, the cool air entering via duct 21. Admission of $O_2$ is preferably controlled by feedback from thermocouples 7 and 8 attached to the reactor chamber in order to prevent overheating. The oxidation of the uranium hydride to uranium oxide is generally complete within one hour. However, it is preferred that oxygen continue to percolate through the reaction chamber for an additional period of time (e.g. about five hours) in order to further homogenize and cool the uranium oxide.

The reaction cell of the present invention has the particular advantage that a very small reaction waste stream is generated, approximately 1 liter of $H_2O$ per 10 kg of uranium processed. The waste stream generated can be efficiently managed by evaporation and filtration through a HEPA filter. In light of the small amount of waste generated, it is clear that plant operability will not be impacted by waste management concerns.

Figure 2:
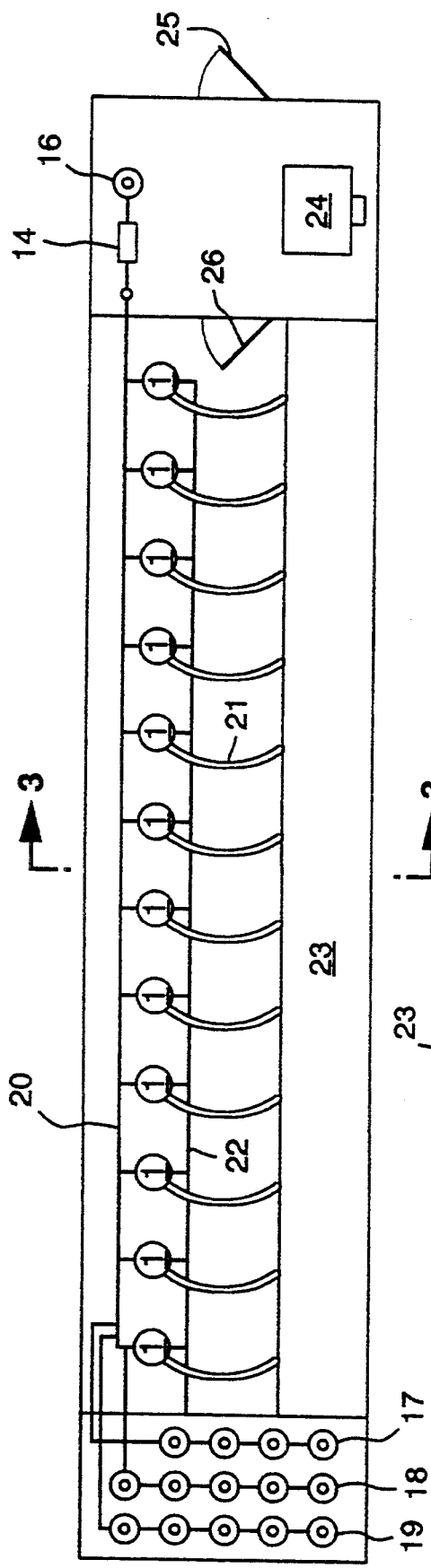
FIGS. 2 and 3 depict a self-contained, transportable highly enriched uranium acceptance and oxidation plant, FIG. 3 being a cross section of FIG. 2, taken along line 3—3.
Figure 3:
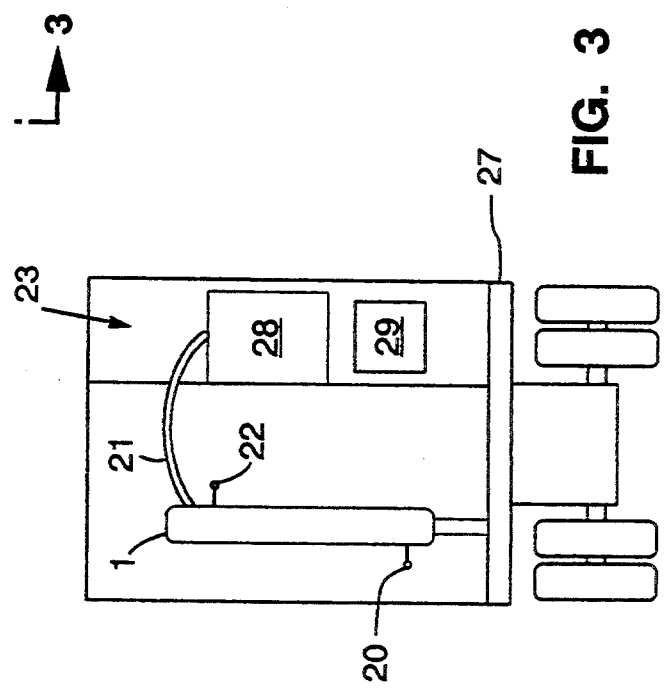

Analysis of the blended uranium oxide can be performed on site with small samples (<0.5 g) using an inductively-coupled-plasma mass-spectrometer, such as the instrument manufactured by V. G. Instruments, Cheshire, England. This instrument is extremely versatile, capable of performing the required isotope ratio measurements with sufficient accuracy (0.5% relative), as well as being capable of performing wide survey scans for other radionuclides and metallic impurities. Analysis of samples using an inductively-coupled-plasma mass-spectrometer is rapid (20–40 samples per day) and requires only minimal sample preparation which can be readily automated. Unlike traditional magnetic sector mass spectrometers, present day inductively-coupled-plasma mass-spectrometry instrumentation is potentially field deployable. These mass-spectrometers have a footprint of less than 16 square feet, weigh less than 500 kg, and are equipped with solid state electronics as well as reliable turbomolecular pumps. Hence, the compact size of these instruments enables them to be set up within a standard 8×40 foot cargo container that can also be used to house the reactor cells (FIGS. 2 and 3). In addition, the use of a quadrupole mass filter vastly reduces the temperature and vibration constraints usually associated with mass spectroscopy.

Handling of the samples can be accomplished using any one of the commercially available sample preparation robot systems such as are available from the Perkin-Elmer Corporation of Norwalk, Conn.

IV. MULTI-REACTION CELL PLANT

The "plant" in which the downblending can advantageously occur is shown in FIGS. 2 and 3. In FIG. 2, twelve cells of the type shown in FIG. 1 can process roughly 100 kg of highly enriched uranium per day. The transportainer is a standard 8×40 foot cargo container along with all of the necessary supplies, plumbing, and operational hardware, as discussed herein. Hence, it is possible to use these reaction cells as a self-contained highly enriched uranium acceptance and oxidation plant. One particular advantage of the arrangement of reactor cells depicted in FIG. 2 is the fact that the entire 8×40 foot container can be shipped back to the U.S. as a unit since, based on each cell's design, the contents will already meet safety and mechanical stability requirements. Using this approach, disassembly and unloading of the uranium oxide filled cells can occur at a more relaxed pace in a more spacious facility upon return to the U.S.

Thus, FIG. 2 shows twelve reaction cell containment vessels 1 positioned along the length of the transportainer. As a reminder of the mobility of the system, the transportainer is shown mounted on a truck trailer 27 in FIG. 3.

Spacing between the cells will be no less than 18 inches to ensure safety. Inlet gas header pipe 20 permits the flow of helium from tank 16, through pycnometer cell 14 to each reaction cell. Outlet header pipe 22 is positioned to recycle gasses to the reaction cells as shown in FIG. 1. Tanks 17, 18 and 19 permit the controlled flow of hydrogen, oxygen and argon as necessary in the process. Ducts 21 permit the flow of cooled air from air cooler 28 to each containment vessel 1, the cooler being positioned in equipment area 23. Controllers and power supplies, shown by reference number 29, can likewise be positioned in area 23. Incoming material is brought into the plant via door 25, where scale 24 can be used to weigh the material. Samples can be taken as appropriate at this point. The material is then moved through door 26 to be loaded in one of the reaction cells.

The reaction cell, reaction cell facility and methods of the present invention for converting inhomogeneous clumps of highly enriched uranium metal to homogeneous, down-blended (if desired), uranium oxide provide several distinct advantages over alternate treatment schemes.

The reaction cell of the present invention has the advantage that it is small, modular, and self contained. The hydride/oxide reaction cell serves as a means for decomposing a uranium charge, sampling and then possible down-blending the highly enriched uranium in addition to being a safe transport means. Due to the reaction cell's compact and efficient design, a plant capable of processing 24 MT/y can be built into a 8×40 foot transportainer requiring only one external utility, electricity. Additional capacity can be realized by replicating the basic unit of FIG. 2.

The method of the present invention has the advantage that a minimal amount of hazardous chemicals are needed. The principal reagent is hydrogen. One standard cylinder of hydrogen is capable of hydriding approximately 40 kg of uranium. Hydrogen is a readily available industrial gas and will generally be obtainable on site. The other reagent employed in the present invention, oxygen is preferably in the form of air.

The uranium oxide produced by the present method is compatible with high quality chemical and isotopic characterization by field deployable instruments. The precision and accuracy of such instruments can be readily calibrated in the field using standards traceable to recognized sanctioning bodies, such as the National Institute for Standards and Technology (NIST). Such measurements can be made in the absence of matrix effects and are sensitive to stable and radioactive isotopes.

The method of the present invention has the further advantage that the product, uranium oxide, is neither corrosive nor pyrophoric. It is therefore safe and easy to transport. Further, once down-blended, the diluted uranium oxide product is difficult to reconvert to weapons use and is therefore a politically attractive commodity.

The method of the present invention also simplifies the accounting associated with the purchase of highly enriched uranium. The weighing and loading of starting material uranium into sealed reactor cells can be witnessed by both the vendor and the buyer. Sampling and analysis can also be performed by both parties prior to acceptance of the material. Moreover, the on site generation of a precise isotopic fingerprint for each batch of material, together with its mass, serves as an indicator of material diversions.

The reaction cell and its use in the homogenization and down-blending of highly enriched uranium are illustrated by the following examples. Further objectives and advantages other than those set forth above will become apparent from the examples and accompanying figures.

V. EXPERIMENTAL

Initial tests in dilute $H_2$—Ar ("safegas") mixtures were limited in rate by our inability to deliver sufficient moles of $H_2$ to the system at a high enough rate. This indicates that use of pure $H_2$ would be more effective. The treatment with air to convert the 2 Kg $UH_3$ sample to $U_3O_8$ was rapid (about 5 min) and extremely exothermic. The temperature in the reactor vessel exceeded 1200° C.

Subsequently, the reactor design of the invention was utilized in a purely oxidizing mode by introducing compressed air at 400° C. The 3 Kg sample of uranium metal spontaneously ignited at this point and the reactor chamber reached a temperature of approximately 650° C. which was sustained for approximately 45 minutes until the uranium charge was converted to oxide. Because of its simplicity, this appears to be the preferred mode of operation.

While the invention of this patent application is disclosed by reference to the aforementioned examples, it is to be understood that these examples are intended in an illustrative rather than limiting sense, as it is contemplated that modifications will readily occur to those skilled in the art, within the spirit of the invention and the scope of the appended claims.

What is claimed is:

1. A reaction cell for converting uranium metal to uranium oxide comprising:
   (a) a housing defining a reaction chamber, said chamber including a lower portion and an upper portion, the lower portion including a diffuser plate having openings therethrough and being adapted to support the uranium metal;
   (b) means for flowing a gas from the lower portion to the upper portion along a gas path, the gas path passing through the openings in the diffuser plate;
   (c) means for reducing a velocity of the gas passing from said lower portion to said upper portion;
   (d) a gas inlet port for allowing entry of hydrogen and oxygen containing reactant gasses into said lower portion of said reaction chamber and through said gas path; and
   (e) a gas outlet port for allowing the exit of residue and reaction product gasses from said upper portion of said reaction chamber.

2. The reaction cell of claim 1, wherein: the diffuser plate is positioned adjacent said gas inlet port.

3. The reaction cell of claim 1, further comprising: means for heating said lower portion of said reaction chamber.

4. The reaction cell of claim 1 wherein said lower portion defines a cylinder having an internal diameter of about two inches, and said upper portion defines a cylinder having an internal diameter of from about four to about twelve inches.

5. The reaction cell of claim 4 wherein said lower portion is about 3 feet in length, and said upper portion is about 3-5 feet in length.

6. The reaction cell of claim 1 further comprising means for recirculating gas from said outlet port to said inlet port.

7. The reaction cell of claim 6 wherein said means for recirculating gas includes a gas compressor.

8. The reactor cell of claim 1 further comprising a thermocouple for measuring the temperature within said lower portion.

9. A method for converting uranium metal to uranium oxide in a reaction cell, comprising the steps of:
   (1) loading a reaction chamber with uranium metal;
   (2) heating said uranium metal to a temperature greater than 225° C.;

(3) flowing a hydrogen-containing gas through said reaction chamber so that the uranium metal is transformed to UH$_3$; and (4) passing an oxygen-containing gas through said reaction chamber after the flowing step thereby forming uranium oxide.

10. The method of claim 9 wherein said flowing step is carried out with the hydrogen-containing gas comprising 5% H$_2$ in Argon.

11. The method of claim 9 wherein the flowing step is carried out with the hydrogen containing gas being added at a pressure between 1–10 psi above the pressure in said reaction chamber.

12. The method of claim 9 further comprising the step of recirculating gas from an outlet to an inlet.

13. The method of claim 9, wherein:
the flowing and passing steps are carried out by flowing and passing the gases through openings in a diffuser plate the diffuser plate supporting the uranium metal.

14. The method of claim 9, wherein:
the loading step is carried out with the reaction chamber having a lower portion containing the uranium metal, an upper portion, and a coupling having a first end and a second end, the first end being attached the lower portion and the second end being attached to the upper portion, the second end being larger than the first end so that a velocity of gas passing from the lower portion to the upper portion decreases when passing through the coupling.

15. The method of claim 9, wherein:
the passing step is carried out with the oxygen-containing gas having a velocity sufficient to entrain solids and carry them into an upper portion of said reaction chamber.

* * * * *